United States Patent

Fapojuwo

[11] Patent Number: 5,937,353
[45] Date of Patent: Aug. 10, 1999

[54] METHOD AND APPARATUS FOR CONTROLLING ALLOCATION OF TRAFFIC CHANNELS IN MACROCELL/MICROCELL TELECOMMUNICATIONS NETWORKS

[75] Inventor: Abraham O. Fapojuwo, Calgary, Canada

[73] Assignee: Nortel Networks Corporation, Montreal, Canada

[21] Appl. No.: 08/832,635

[22] Filed: Apr. 4, 1997

[51] Int. Cl.$^6$ ........................................ H04Q 7/20
[52] U.S. Cl. ........................ 455/444; 455/453; 455/439
[58] Field of Search ................................. 455/439, 443, 455/444, 450, 451, 452, 453, 525, 436

[56] References Cited

U.S. PATENT DOCUMENTS

| | | |
|---|---|---|
| 4,670,899 | 6/1987 | Brody et al. . |
| 5,081,671 | 1/1992 | Raith et al. . |
| 5,265,263 | 11/1993 | Ramsdale et al. . |
| 5,278,991 | 1/1994 | Ramsdale et al. . |
| 5,301,356 | 4/1994 | Bodin et al. . |
| 5,345,499 | 9/1994 | Benveniste . |
| 5,392,453 | 2/1995 | Gudmundson et al. . |
| 5,396,645 | 3/1995 | Huff . |
| 5,546,443 | 8/1996 | Raith . |
| 5,548,806 | 8/1996 | Yamaguchi et al. . |

FOREIGN PATENT DOCUMENTS

| | | |
|---|---|---|
| 92/02104 | 2/1992 | WIPO . |
| 92/02105 | 2/1992 | WIPO . |
| 96/06512 | 2/1996 | WIPO . |

Primary Examiner—Reinhard J. Eisenzopf
Assistant Examiner—Lester G. Kincaid
Attorney, Agent, or Firm—Victoria Donnelly; C. William Junkin

[57] ABSTRACT

In methods and apparatus for controlling allocation of traffic channels in a telecommunications network having macrocells and microcells within the macrocells, a macrocell traffic channel is allocated in response to a request for a microcell traffic channel only when no suitable microcell traffic channel is available, a suitable macrocell traffic channel is available, and the requested microcell traffic channel is requested to implement a microcell to microcell handoff. Allocation of the macrocell traffic channel may further be conditional on a grade of service in the macrocell being deemed acceptable. The grade of service may be deemed acceptable when number of macrocell traffic channels assigned to each microcell is less than a predetermined maximum number of allowable macrocell traffic channels that can be assigned to each microcell (cutoff value) or when more than a threshold number of macrocell channels are available in the macrocell.

10 Claims, 4 Drawing Sheets

METHOD AND APPARATUS FOR CONTROLLING ALLOCATION OF TRAFFIC CHANNELS IN MACROCELL/MICROCELL TELECOMMUNICATIONS NETWORKS

The present invention relates to telecommunications networks having macrocells and microcells within the macrocells. In particular, the invention relates to methods and apparatus for controlling allocation of traffic channels in such telecommunications networks.

BACKGROUND OF THE INVENTION

Radiotelephone communication using mobile communication terminals in mobile telecommunication systems has become very popular. Conventional systems are controlled by at least one mobile services switching center, or MSC, at least one base station, or BS, serving at least one mobile station. The MNC constitutes an interface between the radio-based communication system and the public switching telephone network, or PSTN. The base station acts as a conduit for information between the mobile stations and the MSC. Calls to and from mobile subscribers are switched by the MSC which in addition provides all signalling functions needed to establish the calls.

In order to provide adequate radio coverage of the service area, plural base stations are usually required. The service area is usually divided into so-called macrocells, each normally served by its own base station (in some cases it can share a base station with a number of other cells). Each macrocell can provide communication services via radio link between the macrocell base station and mobile stations (terminals) located in this macrocell, usually in the range of about several kilometers. Assigned to the macrocell are a number of unique communication channels which are usable throughout the macrocell area, i.e. only a single mobile communication terminal operating within the macrocell area may be assigned to any particular macrocell communication channel.

Macrocells are deployed during the initial rollout of a cellular network to provide wide-area coverage. As the cellular network matures, the need for more system capacity arises and one proposal for meeting this need is deployment of so-called microceils as underlay of an existing macrocell. The macrocell area is divided into a number of smaller geographical areas, or microcells, typically of several hundred meters in diameter. Associated with the microcells are a number of microcell communication channels. Certain microceil areas share the same channels, i.e. multiple mobile communication terminals can be assigned to the same communication channel as long as all of the terminals are located in different microcell areas which are geographically separated. Because of geographical separation and assuming low power levels employed with terminals served by microcells, no interference would occur thereby enabling more terminals to be used within a particular macrocell without the need to preempt additional channels. Such a network configuration is often referred to as hierarchical micro-/macro-cellular network.

Though hierarchical micro-/macro-cellular networks allow for much more efficient use of frequency spectrum and hardware resources, there are some problems associated with their operation. After a call in a cell is set up, the quality of the radio link must be monitored to ensure high quality uninterrupted service during the communication session. If the quality of the radio link drops below a predefined level or the terminal moves between cells, the assigned communication channel should be changed or the call should be switched to another base station. Since each microcell covers a relatively small area, moving terminals are likely to traverse multiple microcells during a particular communication session. As a result, multiple microcell communication channels have to be used and multiple transfers or "handoffs" would be required, tying up multiple channels and transfer resources for a single communication session. During peak use periods or in congested urban areas there may be no other target base station receiving a signal of sufficient strength from the terminal or/and no free channel to be used to implement a required handoff. This can lead to an unacceptable call connection deterioration and the call can be lost altogether.

A number of techniques have been used to cope with these problems. Call blockage has been avoided during periods of high demand (when a cell may not have unallocated channels available for handling new calls or call handoffs) by giving microcell-to-microcell handoff requests priority over new call requests originating from a microcell. U.S. Pat. No. 5,301,356 to Bodin (1994) discloses a system and method for ensuring that handoff requests take priority over new call requests to engage voice channels assigned to a specific target cell. According to this technique, a determination is made whether any voice channels of the target cell are available for assignment to call requests. If none is available, handoff requests to the target cell are stored in a queue for a predetermined period of time. New call requests are denied to be served until the queue is empty.

Similarly, U.S. Pat. No. 4,670,899 to Brody (1987) describes a method to avoid call blockage during periods of high demand when a cell may have no free channels available for handling new calls or call handoffs. In this case, the cell utilization is monitored to determine the mode of operation each cell will be directed to. In one of the two predetermined modes of operation voice channels are reserved for incoming handoffs by denying access for mobile transceivers initiating new calls. Such a microcell traffic management technique helps to protect already established calls from being dropped due to a lack of free channels to make an urgently needed handoff, but does not ensure efficient use of the overall communication system capacity.

Another idea is to temporarily use currently available macrocell channels as a backup for microcell communication traffic. The most radical proposal is not to allow microcell-to-microcell handoffs under any circumstances. Any handoff occurs only via the macrocell layer (U.S. Pat. No. 5,278,991 to Ramsdale, 1994). After the terminal has been served by the macrocell for a sufficiently long period, the downward macrocell-to-microcell handoff is performed. Though substantial improvement in the grade of service for the microcell calls can be achieved through implementation of this idea, it can place a great strain on the macrocell layer because handoffs originating from a microcell compete for communication channels with macrocell-to-macrocell handoffs and new calls originating from the macrocell.

A more moderate approach disclosed in the U.S. Pat. No. 5,548,806 to Yamaguchi (1996) and No. 5,396,645 to Huff (1995) is based upon the estimation of the moving terminal speed at a predetermined interval. The terminal is allocated a channel to the microcell base station when moving slowly, and is allocated a channel to the macrocell base station when moving rapidly. Thus, frequent handoff between microcells of rapidly moving terminals can be avoided. Though this approach allows for more flexible interaction between microcell and macrocell layers, it does not take into account the traffic characteristics in both layers of the network. It will not help, for example, in a situation when the number of slowly moving terminals exceeds the microcell traffic capacity. In some cases microcell-to-macrocell handoff can take place, for example, even if free channels are available in the microcell layer.

In summary, known methods for using macrocell channels to carry overflow microcell traffic give an improvement in the grade of service (measured by call blocking) for microcell calls, but at the expense of the grade of service experienced by macrocell calls. The problem of poorer grade of service for macrocel subscribers (when macrocell channels are shared with microcell calls) worsens under heavy macrocell traffic conditions.

SUMMARY OF THE INVENTION

It is therefore an object of the present invention to provide methods and apparatus for efficient traffic channel management in hierarchical micro-/macro-cellular networks.

One aspect of the present invention provides a method for controlling allocation of traffic channels in a telecommunications network having macrocells and microcells within said macrocells. The method comprises responding to a request for a microcell traffic channel in a particular microcell by allocating a macrocell traffic channel in a macrocell containing the particular microcell when and only when:

(a) no microcell traffic channel is available in the particular microcell; and (b) a macrocell traffic channel is available in the macrocell; and (c) the requested microcell traffic channel is requested to implement a microcell to microcell handoff.

According to this method, macrocell traffic channels are allocated to microcell traffic only when needed to implement microcell to microcell handoffs. Consequently, impact of microcell traffic on macrocell grade of service is permitted only to ensure that established microcell calls are not dropped. This limits the impact of microcell traffic on macrocell grade of service.

In an embodiment of the above method, the macrocell traffic channel is allocated when and only when conditions (a), (b) and (c) are met, and:

(d) a grade of service in the macrocell is deemed to be acceptable.

The grade of service in the macrocell may be deemed acceptable when a number of macrocell traffic channels assigned to each microcell is less than a predetermined maximum number of allowable macrocell traffic channels that can be assigned to each microcell (cutoff value). Each of a plurality of microcells may have a cutoff value which may be configurable independently. The configurable cutoff values make the proposed channel allocation system very flexible and permit management of the balance between microcell and macrocell grade of service.

The grade of service in the macrocell may also be deemed acceptable when more than a threshold number of macrocell channels are available in said macrocell.

The threshold number of traffic channels for each macrocell may be configurable independently of the threshold numbers of traffic channels configured for other macrocells.

The configurable threshold numbers permit management of the balance between microcell grade of service and macrocell grade of service on a macrocell by macrocell basis.

Another aspect of the invention provides a telecommunications system having macrocells and microcells within said macrocells. The system comprises a local channel manager and a global channel manager. The local channel manager is operable to respond to a request for a microcell traffic channel in a particular microcell by allocating a microcell traffic channel in the particular microcell when at least one microcell traffic channel is available in said particular microcell, and by sending a message to the global channel manager when no microcell traffic channel is available in the particular microcell and the requested microcell traffic channel is requested to implement a microcell to microcell handoff. The global channel manager is operable in response to the message to cause a macrocell traffic channel to be allocated in a macrocell containing said particular microcell when at least one macrocell traffic channel is available in said macrocell.

The global channel manager may be operable to cause the macrocell traffic channel to be allocated only when a grade of service in said macrocell is deemed to be acceptable.

The grade of service in said macrocell may be deemed acceptable when a number of macrocell channels assigned to each microcell is less than a predetermined cutoff value. The cutoff values for each microcell may be configurable independently.

The grade of service in said macrocell may also be deemed acceptable when more than a threshold number of macrocell channels are available in said macrocell.

The threshold number of traffic channels for each macrocell may be configurable independently of the threshold numbers of traffic channels configured for other macrocells.

Another aspect of the invention provides a processor-readable storage medium for storing instructions for execution by a processor. The instructions comprise instructions for responding to a request for a microcell traffic channel in a particular microcell by allocating a microcell traffic channel in the particular microcell when at least one microcell traffic channel is available in the particular microcell. The instructions further comprise instructions for sending a message to a remote processor when no microcell traffic channel is available in the particular microcell and the requested microcell traffic channel is requested to implement a microcell to microcell handoff.

Yet another aspect of the invention provides a processor-readable storage medium storing instructions for execution by a processor, the instructions comprising instructions for receiving a message sent from a remote processor, the messages requesting allocation of a macrocell traffic channel. The instructions further comprise instructions for responding to the message by causing a macrocell traffic channel to be allocated in a macrocell containing the particular microcell when at least one macrocell traffic channel is available in the macrocell and a grade of service in said macrocell is deemed to be acceptable.

The instructions for responding to the message by causing a macrocell traffic channel to be allocated may comprise instructions for sending a message to a remote processor instructing the remote processor to allocate the macrocell traffic channel.

BRIEF DESCRIPTION OF THE DRAWINGS

The foregoing summary of the present invention, as well as the following detailed description of example embodiments of the invention, will be better understood when read in conjunction with the appended drawings. For the purpose of illustrating the invention, there is shown in the drawings embodiments which are presently preferred, it being understood, however, that the invention is not limited to the specific arrangements and instrumentalities disclosed. In the drawings.

DETAILED DESCRIPTION

Figure 1:
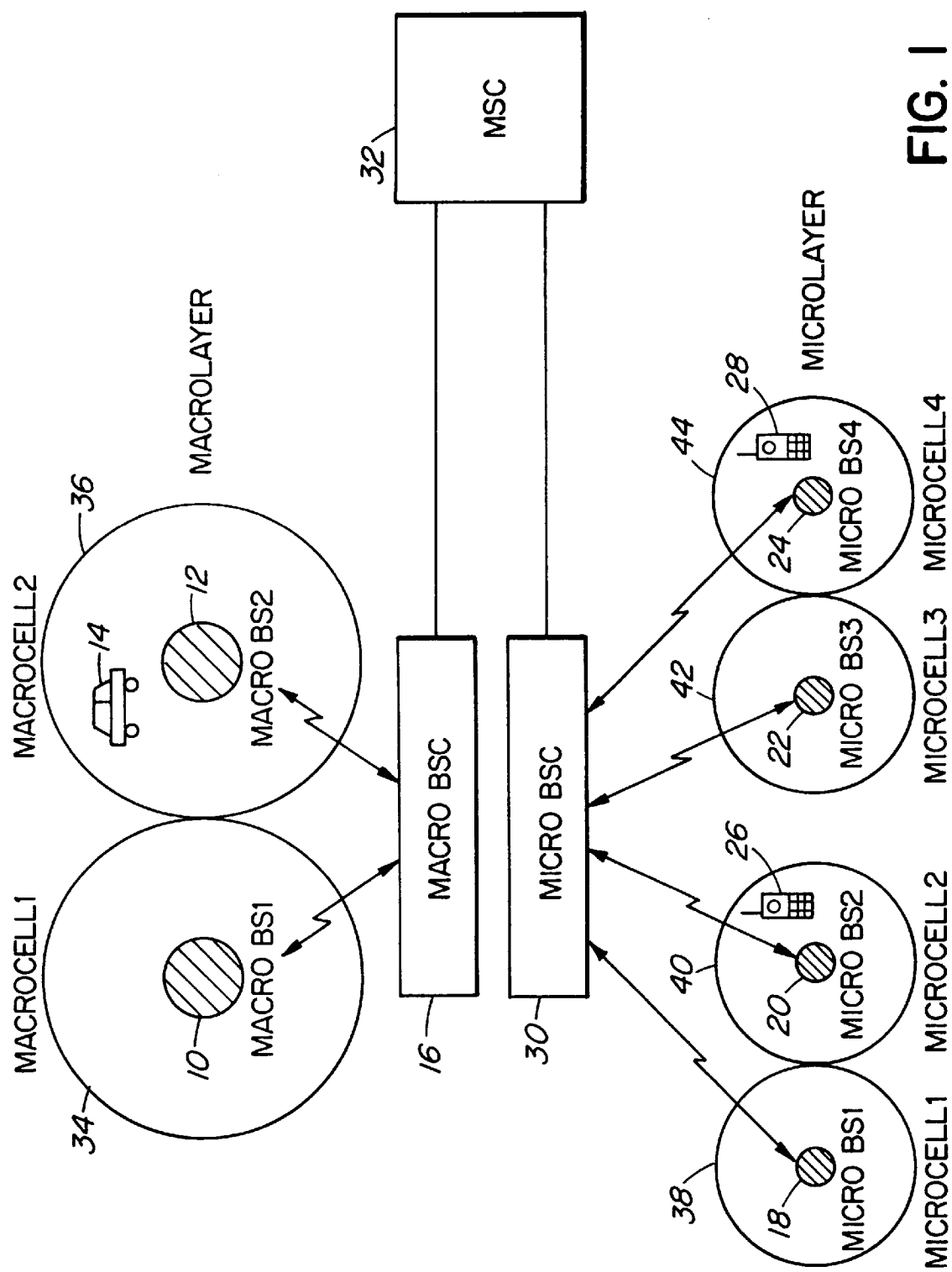
FIG. 1 is a block schematic diagram of a hierarchical micro-/macro-cellular network embodying the invention.

A block schematic diagram of a hierarchical micro-/macro-cellular network is shown in FIG. 1. The network includes a plurality of macrocell base stations 10, 12 (macroBS), a plurality of mobile radio transceivers (only one transceiver 14 is shown), a macrocell base station controller 16 (macroBSC), a plurality of microcell base stations 18, 20, 22, 24 (microBS1–microBS4), a plurality of handsets (only two handsets 26 and 28 are shown), a microcell base station controller 30 (microBSC) and a mobile services switching center 32 (MSC). MacroBSs 10, 12 are installed at fixed locations separated from one another within a geographical area to be served with a macrocell range of several kilometers. Each macroBS defines a geographical macrocell (for example, macroBS 10 serves macrocelli 34, macroBS 12 serves macrocell2 36). MacroBSs 10, 12 establish bi-directional communications with mobile transceivers 14 within the service area of the communication system. MacroBSC 16 controls the operation of each macroBS 10, 12.

MicroBSs 18–24 are deployed within the umbrella coverage of the macrocells 34,36 at fixed locations separated from one another by about several hundred meters. Each of the microBSs 18–24 defines a geographical microcell 38–44 respectively (for example, microBS 18 serves microcelli, microBS 20 serves microcell2, etc.). The microBSs 18–24 establish bi-directional communications with handsets 26, 28 within the service area of the communication system. MicroBSC 30 controls the operation of each microBS 18–24.

The MSC 32 constitutes an interface between the radio-based cellular system and the public switching telephone network. Calls to and from mobile subscribers 14, 26, 28 are switched by the MSC 32 which also provides all signalling functions needed to establish the calls.

After a call is set up, the quality of the radio link is monitored by a mobile station (for example, 26) and/or by the associated cell base station (in our case microBS 20). Since the microcell2 40 is small, chances are that the mobile station 26 will move from microcell2 40 to another microcell (for example, 38) during an already established communication session. To prevent the communication session from undesirable interruption, the call is switched to microBS 18 before the call quality is seriously deteriorated. Normally, such a call handoff is accomplished between the cells of the network layer from which the call was originated (as described in our example), but in the areas of high traffic density or during peak usage there may be no suitable candidate for the handoff except the base station of the overlaying cell (in our case macroBS 10). Borrowing a free channel from the umbrella cell 34 may be the only option for preventing the call from being dropped. This may be acceptable in the areas of a relatively light macrocell communications traffic where unneeded the macrocell to serve macrocell users if macrocell traffic is also high. If, for example, saving a call served by microBS 20 by the handing off to the macroBS 10 results in dropping calls originating in the macrocelli 34, the overall network performance decreases.

To provide a balance between microcell grade of service and macrocell grade of service, a Local Channel Manager (LCM) 50 is provided at the microBSC 30, and a Global Channel Manager (GCM) 52 is provided at the MSC 32. The LCM 50 and the GCM 52 comprise processors 47,51 and processor-readable storage media 49, 53 correspondingly for storing instructions for execution by the processor to perform LCM and GCM functions as described below. The processors and storage media used to implement the LCM and GCN functions may be shared with other microBSC and MSC functions.

Figure 2:
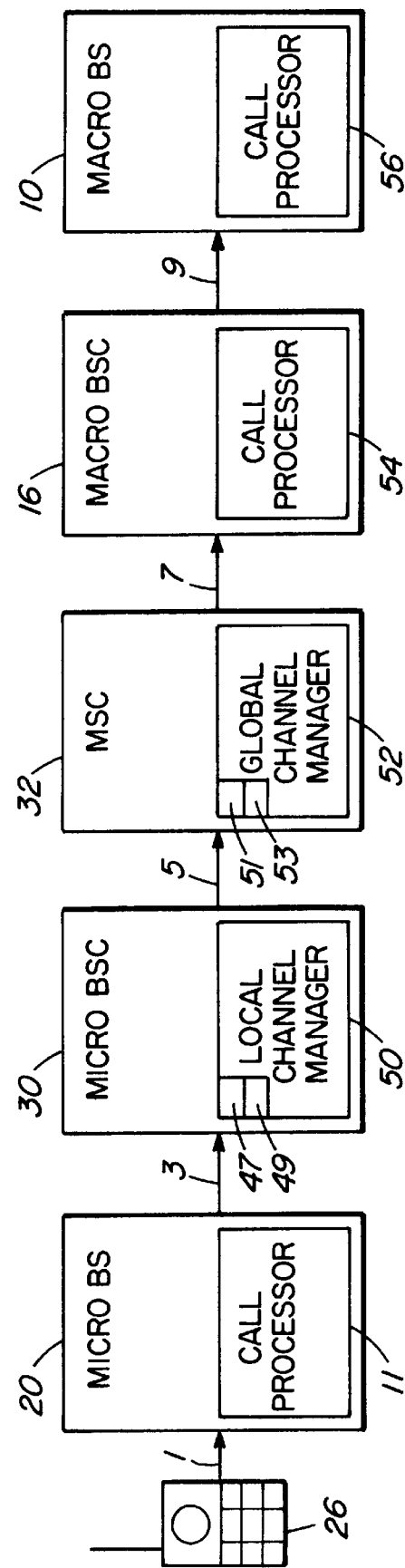
FIG. 2 is a diagram illustrating a call processing sequence.

The place of the LCMs 50 and the GCMs 52 in a call processing sequence of steps will now be described with reference to FIG. 2. When a handset 26 sends a channel assignment request message 1 to the microBS 20 it is processed by a call processor 11 and transferred as a message 3 to the LCM 50 located at the microBSC 30. The LCM 50 is designed to manage the allocation of microBS channels at all the microceils controlled by the microBSC 30 and to interact with the macro layer of the network by sending macroBS channel assignment request messages 5 to the GCM 52, if appropriate.

The GCM 52 located at the MSC 32 manages the allocation of macroBS channels at all the macrocells controlled by the macroBSC 16 by sending a macroBS channel assignment request message 7 to the macroBSC 10 when appropriate. The macroBSC 10 allocates a traffic channel and sends a macro BS channel allocation command 9 to the appropriate macroBS 10–12 to set up the allocated channel.

Figure 3:
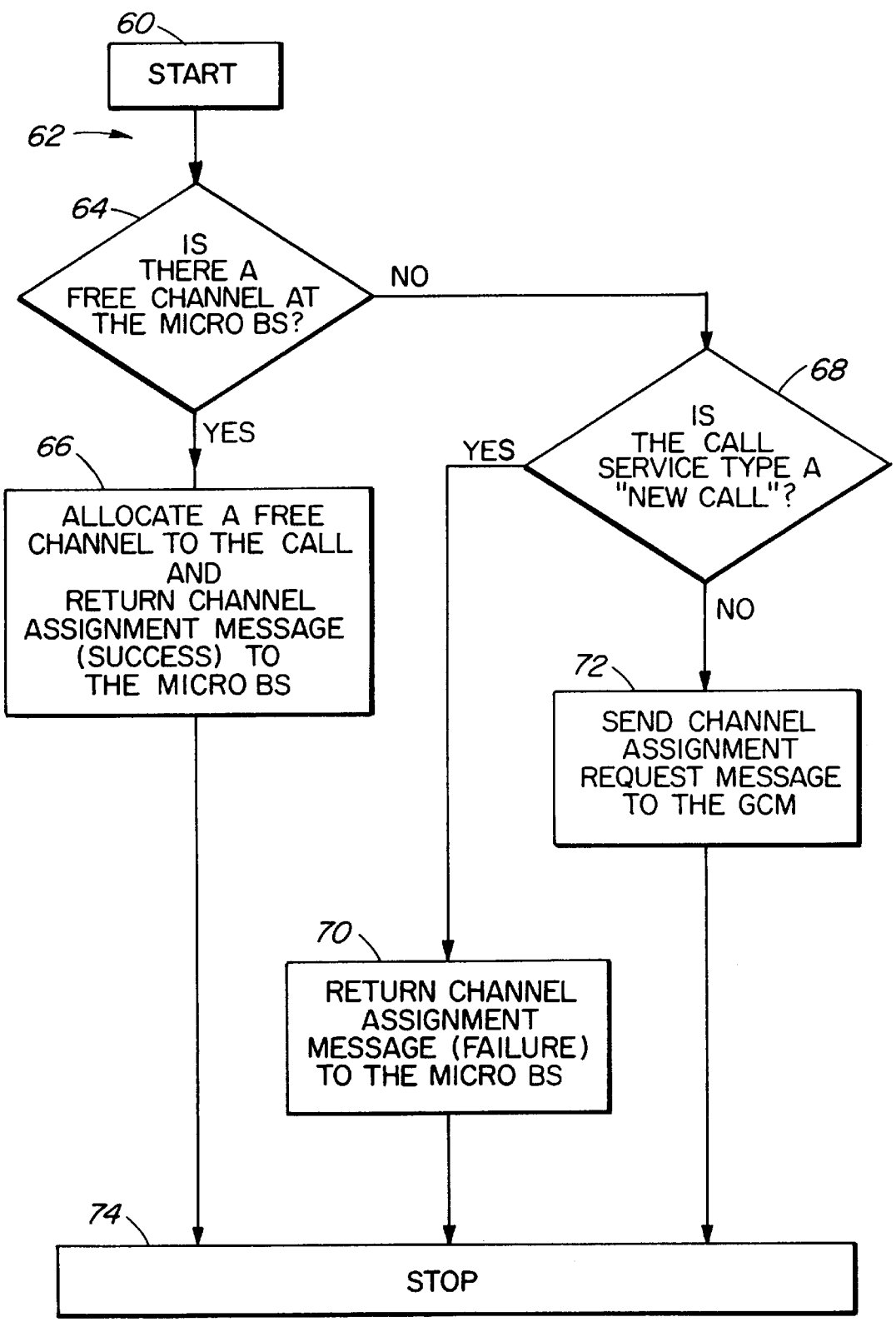
FIG. 3 is a flowchart of a channel allocation algorithm used by Local Channel Manager.

Channel allocation algorithms used by the LCM will be described further in more detail with reference to FIG. 3. Upon start up (block 60), the routine 62 representing the channel allocation algorithm used by the LCM determines whether there is a free channel at the microBS (block 64). If at least one channel is available routine 60 allocates a free channel to the incoming call, returns a channel assignment message (success) to the microBS (block 66) and stops its operation (block 74). If all microcell channels are occupied routine 62 determines the call service type (block 68). Determining the type of call is necessary because the call processing procedure for new calls originating in a microcell and microcell-to-microcell handoff calls is completely different. Routine 62 denies an access to the macroBS channels for a new call by sending a return channel assignment message (failure) to the microBS (block 70), stops its operation (block 74), and the call is blocked. If the call service type is determined to be a microcell-to-microcell handoff, the LCM sends a channel assignment request message to the GCM (block 72). After this the LCM stops its operation (block 74) until the further requests. This algorithm reduces stress imposed by the overflowing microcell-to-macrocell calls on the macrocell layer of the network, but still leaves room for the improvement of the grade of service of the microcell subscribers.

Figure 4:
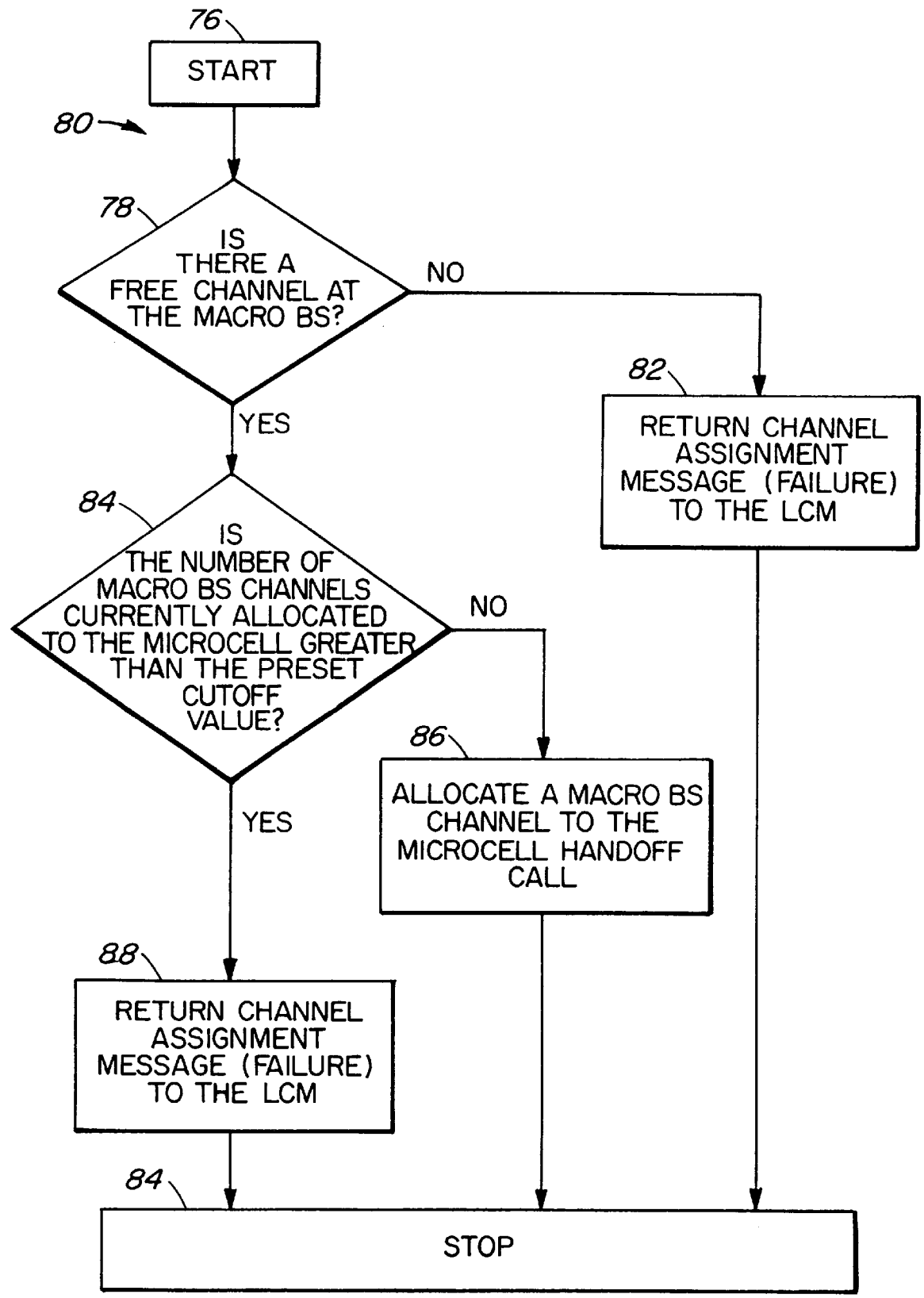
FIG. 4 is a flowchart of a channel allocation algorithm used by Global Channel Manager.

Channel allocation algorithms used by the GCM will be described further in more detail with reference to FIG. 4. Upon start up (block 76), the routine 80 representing the channel allocation algorithm used by the GCM determines whether a free channel at the macroBS is available (block 78). If none of the channels is available, a return channel assignment message (failure) is sent to the LCM (block 82), and the algorithm is terminated (block 84). The GCM keeps a record of the number of free and busy channels at each macroBS and, in addition, it also keeps track, for each macroBS in the network, of the number of macroBS channels that have been currently allocated to each of the microcells underlaying a macrocell. Different criteria may be used to avoid deterioration of grade of service for macrocell subscribers below the preset level. According to one set of criteria there is a maximum number of allowable macrocell traffic channels that can be currently allocated to each microcell (a so-called "cutoff value"), and a grade of service is deemed acceptable when number of macrocell channels assigned to each microcell is less than the cutoff value. According to another set of criteria a threshold number of macrocell channels is introduced in each macrocell, and a grade of service is deemed acceptable when more than a threshold number of macrocell channels are available in that macrocell. The GCM maintains a database of cutoff values for each underlaying microcell and a database of threshold number of traffic channels for each macrocell. In one embodiment all the microcells underlaying a macrocell have the same cutoff value which is set equal to the total number of channels provisioned at the macroBS. In another embodiment the cutoff value is set equal to a number lower than the total number of channels provisioned at the macroBS. Also the cutoff values need not be set exactly to the same number for all the underlaying microcells and they can be configurable. In another embodiment each of the macrocells has the same threshold number of traffic channels which is lower than a total number of traffic channels assigned to that macrocell. Also the threshold number of traffic channels for each macrocell need not be exactly the same for all macrocells. It may be different and configurable independently of the threshold numbers of traffic channels configured for other macrocells.

If a free macrocell traffic channel is available, the GCM checks out whether the microcell-originator of the channel request message is using a number of channels below the preset cutoff value (block 84). If so, the GCM allocates a free macroBS channel (via the macroBSC and the macroBS) to the overflow microcell handoff call (box 86), updates the current macroBS channel usage counter for the microcell (not shown in FIG.4) and stops its operation until a further request is received (box 84). Otherwise a return channel assignment message (failure) is returned to the LCM (box 88), and the GCM stops its operation until a further request is received (box 84).

The ability to manage the balance between microcell and macrocell grade of service by configuring different cutoff values at each microcell or different threshold numbers of traffic channels at each macrocell makes the proposed channel allocation system very flexible and allows for easy adaptation to the ever-changing communication traffic. This is especially beneficial to network operation in high traffic density areas and in non-homogeneous traffic environments, because it allows network operators to fully exploit the network capacity by redistributing network resources from areas of relatively light load to areas of heavy demand. For example, if the load in the area covered by the microcell i is greater than the load in the area covered by microcell j, the microcells can be configured with cutoff values $c_i$ and $c_j$ respectively where $c_i > c_j$. As a result, overall blockage of the calls in both microcells will be minimized without increase in the blockage of macrocells, which in turn means better grade of service for all network subscribers.

While particular embodiments of the present invention have been described and illustrated, it should be understood that the invention is not limited thereto since modifications may be made by persons skilled in the art. The present application is intended to cover any and all modifications which are within the scope and spirit of the invention as defined by the appended claims.

We claim:

1. A method for controlling allocation of traffic channels in a telecommunications network having macrocells and microcells within said macrocells, the method comprising responding to a request for a microcell traffic channel in a particular microcell by allocating a macrocell traffic channel in a macrocell containing said particular microcell when and only when:

(a) all microcell traffic channels are occupied in said particular microcell; and (b) the request is for implementing a microcell to microcell handoff; and (c) a macrocell traffic channel is available in said macrocell; and (d) the total number of macrocell channels currently serving said handoffs is not exceeding a threshold number, the threshold number being less than the total number of macrocell channels in said macrocell.

2. A method as defined in claim 1, wherein the threshold number is a cutoff value equal to the total number of macrocell channels currently allocated to the requesting microcell.

3. A method as defined in claim 2, wherein said cutoff value is the same for all microcells.

4. A method as defined in claim 2, wherein said cutoff value for each microcell is configurable independently of the cutoff values configured for other microcells.

5. A method as defined in claim 1, wherein said threshold number of traffic channels is the same for each macrocell.

6. A method as defined in claim 1, wherein said threshold number of traffic channels for each macrocell is configurable independently of the threshold numbers of traffic channels configured for other macrocells.

7. A method as defined in claim 1, wherein:

the request for a microcell traffic channel in a particular microcell is received at a local channel manager;

the local channel manager allocates a microcell traffic channel when at least one microcell traffic channel is available in said particular microcell;

the local channel manager sends a message to a global channel manager when the conditions (a) and (b) are met; and the global channel manager causes a macrocell traffic channel to be allocated in response to said message when the conditions (c) and (d) are met.

8. A method as defined in claim 7, wherein the global channel manager causes the macrocell traffic channel to be allocated by sending a message to a macrocell base station controller.

9. A telecommunications system having macrocells and microcells within said macrocells, the system comprising a local channel manager and a global channel manager:

the local channel manager being operable to respond to a request for a microcell traffic channel in a particular microcell:

by allocating a microcell traffic channel in said particular microcell when at least one microcell traffic channel is available in said particular microcell; and by sending a message to the global channel manager when and only when (a) all microcell traffic channels are occupied in said particular microcell; and (b) the request is for implementing a microcell to microcell handoff;

the global channel manager being operable in response to said message to cause a macrocell traffic channel to be allocated in a macrocell containing said particular microcell when and only when (c) a macrocell traffic channel is available in said macrocell, and (d) the total number of macrocell channels currently serving said handoffs is not exceeding a threshold number which is less than the total number of macrocell channels in said macrocell.

10. A system as defined in claim 9, wherein the threshold number is a cutoff value equal to the total number of macrocell channels currently allocated to the requesting microcell.

* * * * *